(12) United States Patent
Wood et al.

(10) Patent No.: US 7,879,472 B2
(45) Date of Patent: Feb. 1, 2011

(54) MICRO FUEL CELL

(75) Inventors: Roland A. Wood, Bloomington, MN (US); Tom Rezachek, Cottage Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1055 days.

(21) Appl. No.: 10/850,673

(22) Filed: May 21, 2004

(65) Prior Publication Data

US 2005/0260461 A1 Nov. 24, 2005
US 2009/0117413 A9 May 7, 2009

Related U.S. Application Data

(63) Continuation of application No. 10/750,581, filed on Dec. 29, 2003.

(51) Int. Cl.
*H01M 8/00* (2006.01)
*H01M 8/10* (2006.01)
*H01M 8/24* (2006.01)

(52) U.S. Cl. .............................. 429/18; 429/12; 429/30
(58) Field of Classification Search ........................ None
See application file for complete search history.

(56) References Cited

U.S. PATENT DOCUMENTS

| | | | |
|---|---|---|---|
| 2,935,382 A | 5/1960 | Osborn et al. |
| 3,133,837 A | 5/1964 | Eidensohn |
| 3,594,232 A | 7/1971 | Spahrbier |
| 3,931,395 A | 1/1976 | Beckert et al. |
| 4,048,385 A | 9/1977 | Regnaut |
| 4,476,196 A | 10/1984 | Poeppel et al. |
| 4,476,197 A | 10/1984 | Herceg |
| 4,596,748 A | 6/1986 | Katz et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,906,536 A | 3/1990 | Simonton |
| 4,910,100 A | 3/1990 | Nakanishi et al. |

(Continued)

FOREIGN PATENT DOCUMENTS

DE 19734259 2/1999

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner*—Robert Hodge
(74) *Attorney, Agent, or Firm*—Crompton Seager & Tufte LLC (57) ABSTRACT

A fuel cell, fuel cell array and methods of forming the same are disclosed. The fuel cell can be made by forming a first aperture defined by a first aperture surface through a first electrode layer and forming a second aperture defined by a second aperture surface through a second electrode layer. A proton exchange membrane is laminated between the first electrode layer and the second electrode layer. At least a portion of the first aperture is at least partially aligned with the second aperture.

10 Claims, 8 Drawing Sheets

U.S. PATENT DOCUMENTS

| | | | |
|---|---|---|---|
| 5,298,341 A | 3/1994 | Khankar et al. | |
| 5,372,617 A | 12/1994 | Kerrebrock et al. | |
| 5,449,697 A | 9/1995 | Noaki et al. | |
| 5,534,363 A | 7/1996 | Sprouse et al. | |
| 5,804,329 A | 9/1998 | Amendola | |
| 5,836,750 A | 11/1998 | Cabuz | |
| 5,851,689 A | 12/1998 | Chen | |
| 5,861,221 A | 1/1999 | Ledjeff et al. | |
| 6,093,501 A | 7/2000 | Werth | |
| 6,127,058 A | 10/2000 | Pratt et al. | |
| 6,179,986 B1 | 1/2001 | Swette et al. | |
| 6,250,078 B1 | 6/2001 | Amendola et al. | |
| 6,268,076 B1 | 7/2001 | Dickmann et al. | |
| 6,280,869 B1 | 8/2001 | Chen | |
| 6,326,097 B1 | 12/2001 | Hockaday | |
| 6,393,894 B1 | 5/2002 | Bonne et al. | |
| 6,471,850 B2 | 10/2002 | Shiepe et al. | |
| 6,524,450 B1 | 2/2003 | Hara | |
| 6,535,658 B1 | 3/2003 | Mendoza et al. | |
| 6,541,149 B1 | 4/2003 | Maynard et al. | |
| 6,596,236 B2 | 7/2003 | DiMeo, Jr. et al. | |
| 6,610,193 B2 | 8/2003 | Schmitman | |
| 6,620,542 B2 | 9/2003 | Pan | |
| 6,632,554 B2 | 10/2003 | Doshi et al. | |
| 6,638,654 B2 * | 10/2003 | Jankowksi et al. | 429/26 |
| 6,645,651 B2 | 11/2003 | Hockaday et al. | |
| 6,672,078 B2 | 1/2004 | Ovshinsky et al. | |
| 6,727,012 B2 | 4/2004 | Chen et al. | |
| 6,801,136 B1 | 10/2004 | Goodman et al. | |
| 6,803,136 B2 | 10/2004 | Ong et al. | |
| 6,804,949 B2 | 10/2004 | Andrews et al. | |
| 6,833,207 B2 | 12/2004 | Joos et al. | |
| 6,852,436 B2 | 2/2005 | Badding et al. | |
| 6,866,806 B2 | 3/2005 | Andrews et al. | |
| 6,942,941 B2 | 9/2005 | Blunk et al. | |
| 6,953,009 B2 | 10/2005 | Reinke et al. | |
| 7,049,024 B2 | 5/2006 | Leban | |
| 7,128,997 B2 | 10/2006 | Harding et al. | |
| 7,322,205 B2 | 1/2008 | Bourne et al. | |
| 7,367,334 B2 | 5/2008 | Faison, Jr. et al. | |
| 7,524,342 B2 | 4/2009 | Brinkley, III | |
| 7,691,527 B2 | 4/2010 | Petillo et al. | |
| 2001/0028973 A1 | 10/2001 | Ong et al. | |
| 2002/0068213 A1 | 6/2002 | Kaiser et al. | |
| 2002/0154310 A1 | 10/2002 | DiMeo, Jr. et al. | |
| 2002/0177031 A1 | 11/2002 | Doshi et al. | |
| 2002/0182459 A1 | 12/2002 | Hockaday et al. | |
| 2003/0054215 A1 | 3/2003 | Doshi et al. | |
| 2003/0157018 A1 | 8/2003 | Zaluski et al. | |
| 2003/0215679 A1 | 11/2003 | Reinke et al. | |
| 2004/0053100 A1 * | 3/2004 | Stanley et al. | 429/30 |
| 2004/0215407 A1 | 10/2004 | Thielman et al. | |
| 2005/0142410 A1 | 6/2005 | Higashi et al. | |
| 2005/0166812 A1 | 8/2005 | Noll et al. | |
| 2005/0199546 A1 | 9/2005 | Rusta-Sallehy et al. | |
| 2006/0045228 A1 | 3/2006 | Shiao et al. | |
| 2006/0210850 A1 | 9/2006 | Abouatallah et al. | |
| 2006/0261349 A1 | 11/2006 | Doering et al. | |
| 2007/0105008 A1 | 5/2007 | Gu et al. | |
| 2007/0217994 A1 | 9/2007 | Amendola et al. | |
| 2007/0259227 A1 | 11/2007 | Oishi et al. | |
| 2007/0269698 A1 | 11/2007 | Gu | |
| 2007/0275291 A1 | 11/2007 | Gu et al. | |
| 2007/0277870 A1 | 12/2007 | Wechsler | |
| 2007/0287059 A1 | 12/2007 | Eickhoff et al. | |

FOREIGN PATENT DOCUMENTS

| | | |
|---|---|---|
| EP | 1351329 | 10/2003 |
| EP | 1372205 | 12/2003 |
| EP | 1496561 | 1/2005 |
| EP | 1372205 | 10/2008 |
| GB | 723180 | 2/1955 |
| GB | 2164446 | 3/1986 |
| JP | 57138782 | 8/1982 |
| JP | 60000066 | 1/1985 |
| JP | 04342439 | 11/1992 |
| JP | 06066787 A * | 3/1994 |
| JP | 09326259 | 12/1997 |
| JP | 2004206998 | 7/2004 |
| WO | WO0035032 | 6/2000 |
| WO | WO0045457 | 8/2000 |
| WO | 0185606 | 11/2001 |
| WO | 03084866 | 10/2003 |
| WO | WO2004/025750 | 3/2004 |
| WO | 2004035464 | 4/2004 |
| WO | 2004075375 | 9/2004 |
| WO | 2005013403 | 2/2005 |

OTHER PUBLICATIONS

Amendola et al., "A Safe Portable Hydrogen Gas Generator Using Aqueous Borohyfride Solution and Ru Catalyst," International Journal of Hydrogen Energy, Vo., 25, No. 10, pp. 969-975, Oct. 2000.

Amendola et al., "A Novel High Power Density Borohydride-Air Cell," Electromechanical Society Proceedings, vol. 98-15, pp. 47-54, Nov. 1, 1998.

Amendola et al., An Ultrasafe Hydrogen Generator: Aqueous, Alkaline Borohydride Solutions and Ru Calalyst, Journal of Power Sources, vol. 85, No. 2, pp. 186-189, Feb. 2000.

http://www.engadget.com/2010/02/03/horizon-debuts-h-cell...,
"Horizon Debuts H-Cell 2.0 Hydrogen Fuel Cell System for R/C Cars," 3 pages, printed Feb. 12, 2010.

Horizon Fuel Cell Technologies, "Hobby RC Industry Leaps into the Future with Hydrogen Power," 2 pages, Feb. 3, 2010.

* cited by examiner

MICRO FUEL CELL

This application is a continuation of co-pending U.S. patent application Ser. No. 10/750,581, filed Dec. 29, 2003, entitled "Micro Fuel Cell".

FIELD OF THE INVENTION

The present invention generally relates to the field of fuel cells, and more particularly, to micro fuel cells and methods of making the same.

BACKGROUND OF THE INVENTION

A fuel cell produces electrical energy by electrochemically oxidizing a fuel such as hydrogen or methanol in the cell to directly convert the chemical energy of the fuel into electrical energy. Fuel cells have recently drawn attention as a clean supply source for electrical energy.

Powering of portable and/or wireless electronic devices is a significant issue in today's marketplace. While the speed and functionality of many wireless sensors and/or portable telecommunications and computing devices tend to be limited by the power sources, the availability of good power sources is lagging behind development of the electronic devices themselves. Thus, improved power supply and management is constantly being sought.

A number of miniature fuel cells suitable for use with electronic products are becoming available today, but less attention has been shown to the low-cost mass production and device packaging of these fuel cells for varied applications. There is limited information in the literature concerning such things as the methods for manufacturing the fuel cells in a low-cost and efficient manner.

SUMMARY OF THE INVENTION

The present invention generally relates to a fuel cell, fuel cell array and methods of forming the same. In one illustrative embodiment, a fuel cell is made by forming a first aperture defined by a first aperture surface through a first electrode layer and forming a second aperture defined by a second aperture surface through a second electrode layer. A proton exchange membrane is then laminated between the first electrode layer and the second electrode layer, with the proton exchange membrane spanning the first aperture and the second aperture. A plurality of fuel cells may also be made in a similar manner, as further described below.

In some embodiments, and to help promote adhesion between the first electrode layer, the second electrode layer and the proton exchange membrane, an adhesive may be provided between the electrode layers and the proton exchange membrane. Depending on the method of making the fuel cells, the apertures can be formed before or after the adhesive is provided.

In some embodiments, the first electrode layer and/or the second electrode layer may include a conductive substrate, while in other embodiments, the first electrode layer and/or the second electrode layer may include a non-conductive substrate with a conductive layer applied to at least a portion thereof. When a conductive layer is applied, the conductive layer may be patterned to form one or more fuel cell electrical contacts. In some cases, the electrical contacts may extend from adjacent the proton exchange membrane near the apertures to a region that is beyond the extent of the proton exchange membrane. When such electrical contacts are provided on both the first electrode layer and the second electrode layer, at least some of the electrical contacts on the first electrode layer may become electrically connected to at least some of the electrical contacts on the second electrode layer, when the first electrode layer and the second electrode layer are laminated together. By appropriately patterning the electrical contacts on the first and second electrode layers, two or more fuel cells may be electrically connected in series, in parallel or some combination thereof to provide the desired electrical output characteristics.

A plurality of fuel cells can be formed by using any number of methods disclosed therein. For example, the first electrode layer and the second electrode layer may include many apertures, each defining a fuel cell. When a proton exchange membrane is laminated between the first electrode layer and the second electrode layer, a plurality of fuel cells may be made. The plurality of fuel cells can then be diced into single fuel cells or fuel cell arrays, as desired. In another illustrative embodiment, a first length of material having a first plurality apertures and a first plurality of electrical contacts may be moved with a second length of material having a second plurality apertures and a second plurality of electrical contacts into a joining unit with a proton exchange membrane therebetween. The second plurality of apertures are preferably in registration with the first plurality of apertures. Once joined, the resulting plurality of fuel cells can be diced into single fuel cells or fuel cell arrays, as desired

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

The present invention is applicable for use with all devices, and in particular, those devices that can use small sized power sources. In some illustrative embodiments, the present invention provides electrical power using hydrogen and oxygen as a fuel source. While the present invention is not so limited, an appreciation of various aspects of the invention will be gained through a discussion of the various illustrative embodiments and examples provided below.

Figure 1A:
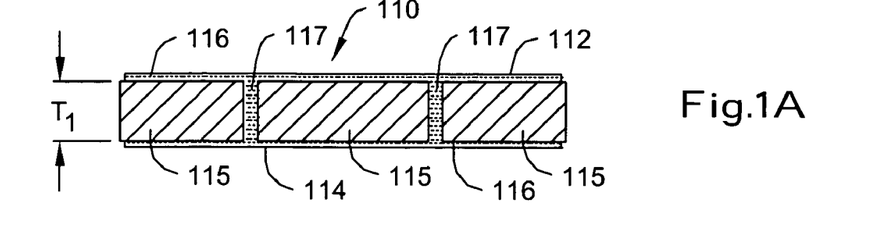
FIG. 1A-1D are cross-sectional schematic views of an illustrative micro fuel cell at various steps of during manufacture.

FIG. 1A-1D are cross-sectional schematic views of an illustrative micro fuel cell at various steps of manufacture. In FIG. 1A, an electrode 110 has a top surface 112, a bottom surface 114 and a thickness $T_1$ defined by the distance between the top surface 112 and the bottom surface 114. In the illustrative embodiment, a substrate 115, which may be a non-conductive substrate, is coated with a conductive material 116 on at least a portion of the top surface and at least a portion of the bottom surface 114. The conductive material 116 can have any useful thickness, such as, for example, a thickness of up to 1000 Angstroms or more, as desired. Optional feed-through contacts 117 are also shown electrically connecting the conductive material 116 on the top surface 112 with the conductive material 116 on the bottom surface 114. In an illustrative embodiment, the electrode 110 can have any useful thickness such as, for example, a thickness of 2 mil or less. In some embodiments, the conductive material 116 may be patterned to form one or more electrical contacts or pads. Patterning the conductive material 116 may, for example, help electrically isolate adjacent fuel cells when a number of fuel cells are formed simultaneously.

Figure 1B:
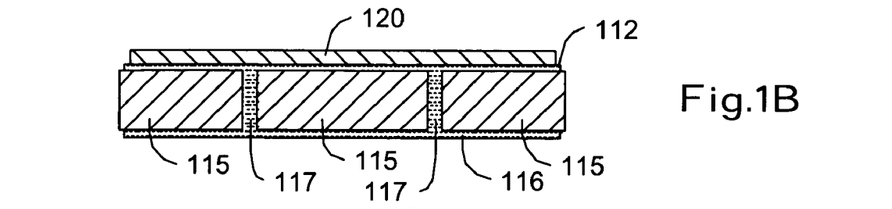

In FIG. 1B, an optional adhesive layer 120 can be disposed on the electrode 110. The adhesive layer 120 may be conductive and can be disposed using conventional methods. The adhesive layer 120 can have any useful thickness, and like the conductive material 116 above, may be patterned in some embodiments, as desired.

Figure 1C:
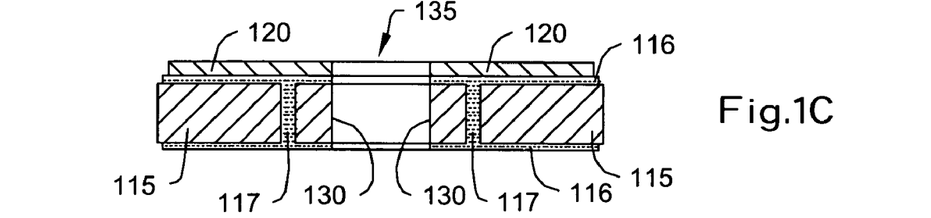

In FIG. 1C, an aperture 135 is formed through the electrode 110 thickness $T_1$. The aperture 135 can be formed using conventional methods such as, for example, punching, etching, or laser cutting. The aperture 135 is defined by an aperture surface 130 surround the aperture 135. The aperture 135 can be any size or shape. In one illustrative embodiment, the aperture 135 is rectangular, square, or round and has a cross-sectional surface area of less than 1 mm². However, other shapes and sizes may also be used, as desired. In FIG. 1A-1C, the adhesive 120 is shown as being applied before the aperture 135 is formed. However, in other embodiments, the adhesive 120 may be applied after the aperture 135 is formed.

Figure 1D:
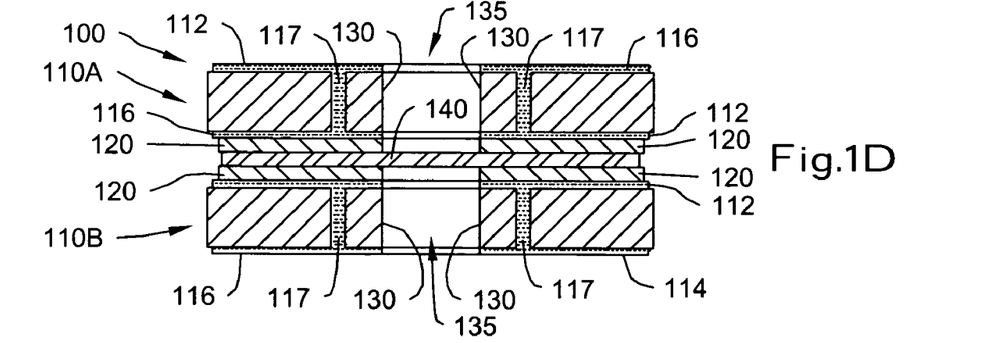

FIG. 1D shows a proton exchange membrane 140 laminated between a first electrode 110A and a second electrode 110B. The first electrode 110A and the second electrode 110B can be similar to the electrode 110 described above. The proton exchange membrane 140 may be any suitable material that allows ions to conduct across it. Forming the proton exchange membrane encompasses in situ techniques such as spin or solution casting, as well as providing a preformed film onto a catalyst. An illustrative commercially available proton exchange membrane is Nafion®, sold by Dupont (a perfluorosulfuric acid membrane with a polytetrafluoroethylene backbone). Other proton exchange membranes are commercially available, and are known to those skilled in the art. In a preferred embodiment, the proton exchange membrane can have a thickness ranging from 10 to 50 micrometers. However, other thicknesses may be used, if desired. The proton exchange membrane 140 can further include a top and bottom catalyst layer such as, for example, a carbon/platinum layer adjacent the proton exchange membrane 140.

In the illustrative embodiment, the adhesive layer 120 is disposed between the proton exchange membrane 140 and the first electrode 110A, and between the proton exchange membrane 140 and the second electrode 110B. The aperture of the first electrode 110A is aligned with the aperture of the second electrode 110B, thereby forming a fuel cell 100. While perfect alignment between the aperture of the first electrode 110A and the aperture of the second electrode 110B is not required, the aperture of the first electrode 110A is preferably at least partially aligned with the aperture of the second electrode 110B.

The illustrative fuel cell 100 operates as follows. Fuel, e.g., hydrogen or methanol, is introduced into the aperture 135 in the first electrode 110A and it diffuses to the first catalyst layer on the proton exchange membrane 140 first electrode side 110A. The first catalyst layer promotes removal of electrons (for hydrogen fuel) according to the relationship:

For methanol, the relationship is:

The electrons flow from the first catalyst layer through the conductive material 116 on the first electrode 110A and through an external circuit (not shown), while the hydrogen ions (i.e., protons) move across the proton exchange membrane 140 toward the second catalyst layer on the proton exchange membrane 140 second electrode side 110B.

Figure 1E:
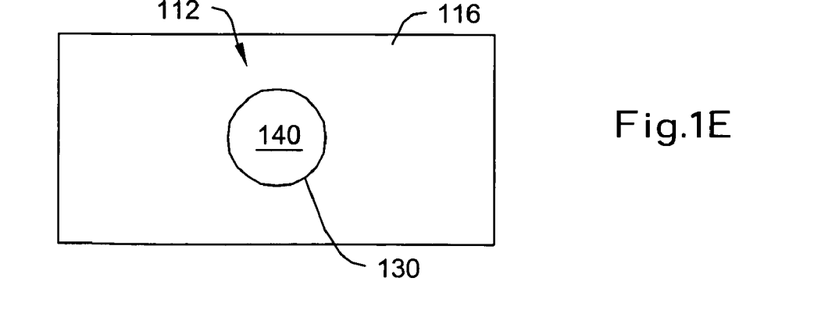
FIG. 1E is a top schematic view of the micro fuel cell shown in FIG. 1D.

An oxidant, e.g., air or oxygen, is directed into the second electrode 110B aperture 135 and diffuses to the second catalyst layer on the proton exchange membrane 140. At this second catalyst layer, oxygen from the oxidant reacts both with the hydrogen ions flowing across the membrane 140 and with the electrons flowing to the second catalyst layer from the external circuit to form water, according to the relationship:

The electron flow provides the desired current, and the water by-product is removed from the cell, often by evaporation. FIG. 1E is a top schematic view of the illustrative embodiment of a micro fuel cell 100 shown in FIG. 1D.

Figure 2A:
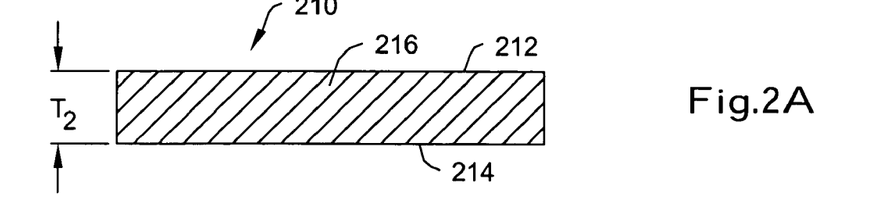
FIG. 2A-2D are cross-sectional schematic views of another illustrative micro fuel cell at various steps of during manufacture.

FIG. 2A-2D are cross-sectional schematic views of another illustrative micro fuel cell at various steps of manufacture. In FIG. 2A, an electrode 210 has a top surface 212, a bottom surface 214 and a thickness $T_2$ defined by the distance between the top surface 212 and the bottom surface 214. In the illustrative embodiment, the electrode 210 is a conductive material such as, for example, a conductive metal or conductive polymer. In an illustrative embodiment, the electrode 210 can have any useful thickness such as, for example, a thickness of 2 mil or less. However, other thicknesses may also be used.

Figure 2B:
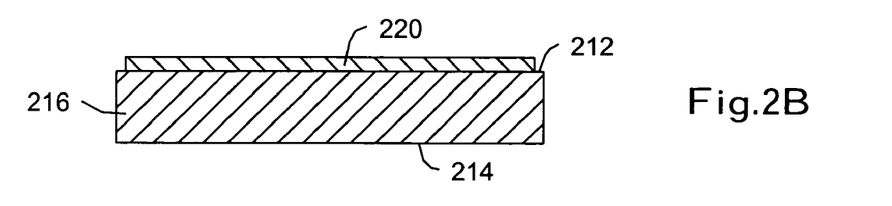

In FIG. 2B, an optional adhesive layer 220 can be disposed on the electrode 210. The adhesive layer 220 may be conductive and can be disposed using conventional methods. The adhesive layer 220 can have any useful thickness.

Figure 2C:
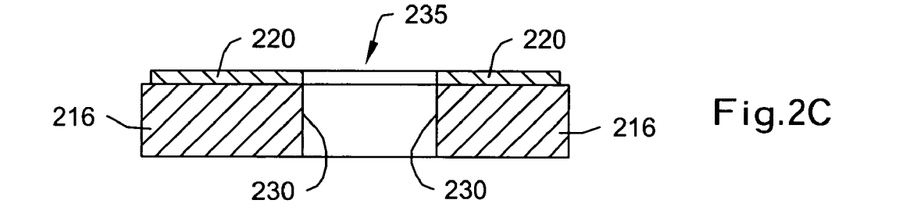

In FIG. 2C, an aperture 235 can be formed through the electrode 210 thickness $T_2$. The aperture 235 can be formed using conventional methods such as, for example, punching, etching, or laser cutting. The aperture 235 is defined by an aperture surface 230 surrounding the aperture 235. The aperture 235 can be any useful size or shape. In an illustrative embodiment, the aperture 235 is rectangular, square, or round and has a cross-sectional surface area of less than 1 mm$^2$. In FIG. 2A-2C, the adhesive 220 is shown as being applied before the aperture 235 is formed. However, in other embodiments, the adhesive 220 may be applied after the aperture 235 is formed.

Figure 2D:
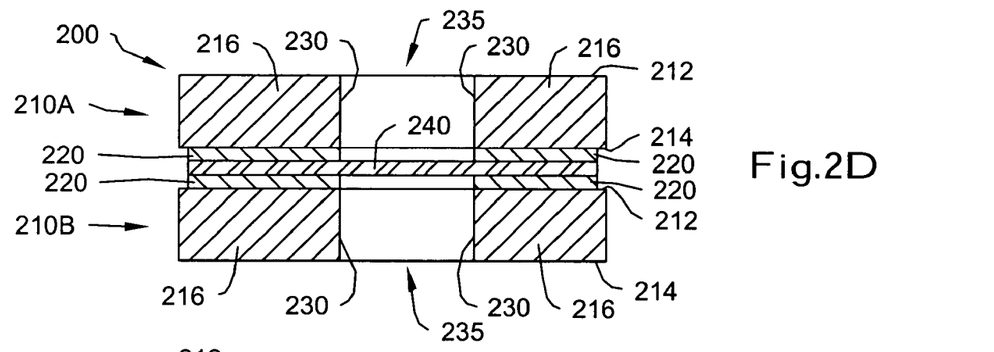
Figure 2E:
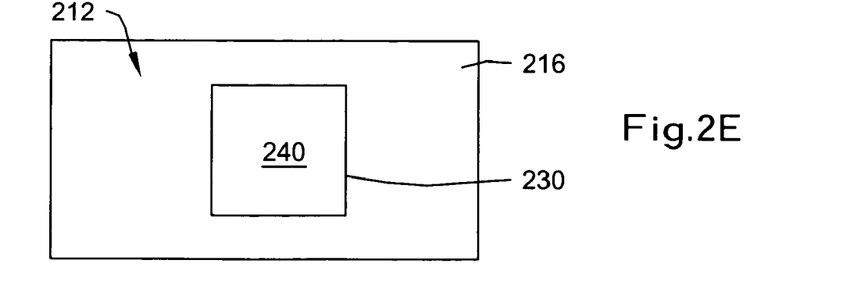
FIG. 2E is a top schematic view of the micro fuel cell shown in FIG. 2D.

FIG. 2D shows a proton exchange membrane 240 laminated between a first electrode 210A and a second electrode 210B. The first electrode 210A and the second electrode 210B can be similar to the electrode 210 described above. In the illustrative embodiment, the adhesive layer 220 is disposed between the proton exchange membrane 240 and the first electrode 210A, and between the proton exchange membrane 240 and the second electrode 210B. Like above, the aperture of the first electrode 210A is at least partially aligned with the aperture of the second electrode 210B. The completed assembly forms a fuel cell 200. The proton exchange membrane 240 can further include a top and bottom catalyst layer adjacent the proton exchange membrane 240, as described above. FIG. 2E is a top schematic view of the illustrative embodiment of a micro fuel cell 200 shown in FIG. 2D.

Figure 3A:
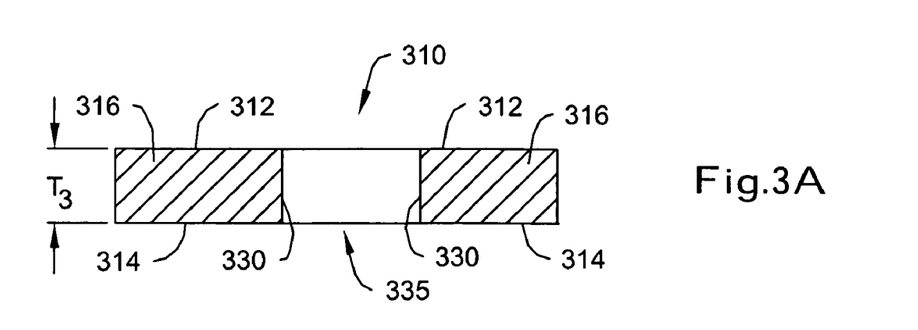
FIG. 3A-3C are cross-sectional schematic views of another illustrative micro fuel cell at various steps of during manufacture.

FIG. 3A-3D are cross-sectional schematic views of another illustrative micro fuel cell at various steps during manufacture. In FIG. 3A, an electrode 310 has a top surface 312, a bottom surface 314 and a thickness $T_3$ defined by the distance between the top surface 312 and the bottom surface 314. In the illustrative embodiment, the electrode 310 is a conductive material such as, for example, a conductive metal or conductive polymer. In an illustrative embodiment, the electrode 310 can have any useful thickness such as, for example, a thickness of 2 mil or less.

In the illustrative embodiment, an aperture 335 can be pre-formed through the electrode 310 thickness $T_3$. The aperture 335 can be formed using conventional methods such as, for example, punching, etching, or laser cutting. The aperture 335 is defined by an aperture surface 330 surrounding the aperture 335. The aperture 335 can be any useful size or shape. In an illustrative embodiment, the aperture 335 is rectangular, square, or round and has a cross-sectional surface area of less than 1 mm$^2$.

Figure 3B:
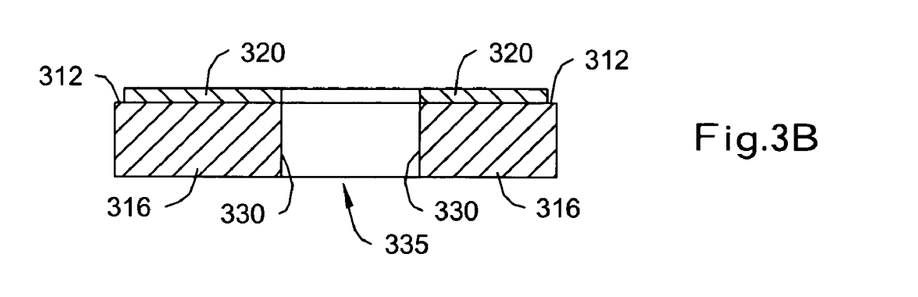
Figure 3C:
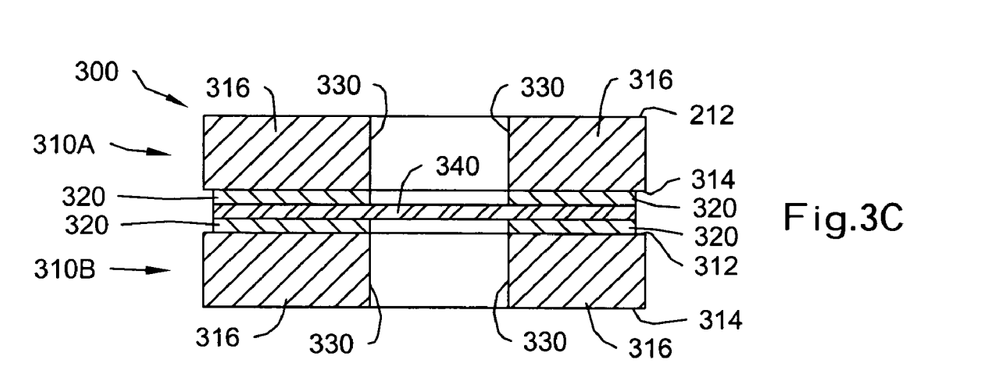

In FIG. 3B, an optional adhesive layer 320 can be disposed on the electrode 310. The adhesive layer 320 may be conductive and may be disposed using conventional methods. The adhesive layer 320 can have any useful thickness. In FIG. 3A-3C, the adhesive 320 is shown as being applied after the aperture 335 is formed. However, in other embodiments, the adhesive 320 may be applied before the aperture 335 is formed.

Figure 3D:
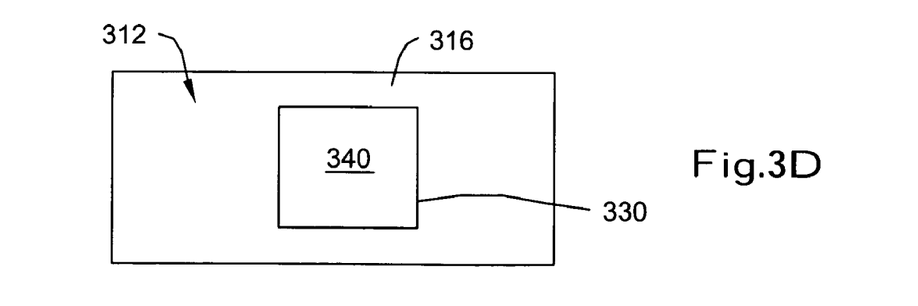
FIG. 3D is a top schematic view of the micro fuel cell shown in FIG. 3C.

FIG. 3C shows a proton exchange membrane 340 laminated between a first electrode 310A and a second electrode 310B. The first electrode 310A and the second electrode 310B can be similar to the electrode 310 described above. In the illustrative embodiment, the adhesive layer 320 is disposed between the proton exchange membrane 340 and the first electrode 310A, and between the proton exchange membrane 340 and the second electrode 310B. The aperture of the first electrode 310A is at least partially aligned with the aperture of the second electrode 310B. The completed assembly forms a fuel cell 300. The proton exchange membrane 340 can further include a top and bottom catalyst layer adjacent the proton exchange membrane 340, as described above. FIG. 3D is a top schematic view of the illustrative embodiment of a micro fuel cell 300 shown in FIG. 3C.

Figure 4A:
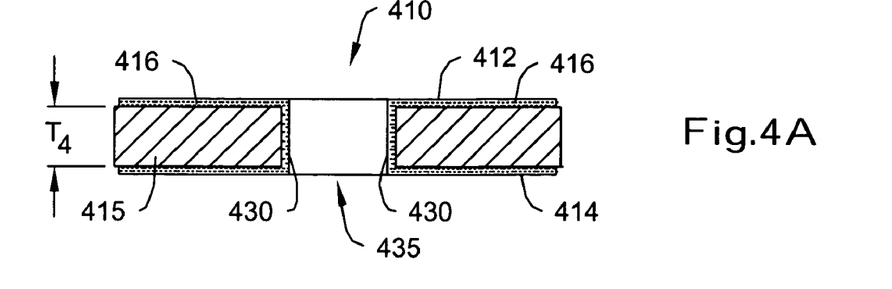
FIG. 4A-4C are cross-sectional schematic views of another illustrative micro fuel cell at various steps of during manufacture.

FIG. 4A-4D are cross-sectional schematic views of another illustrative micro fuel cell at various steps of during manufacture. In FIG. 4A, an electrode 410 has a top surface 412, a bottom surface 414 and a thickness $T_4$ defined by the distance between the top surface 412 and the bottom surface 414. In the illustrative embodiment, the electrode 410 includes a non-conductive material or substrate 415. In an illustrative embodiment, the electrode 410 can have any useful thickness such as, for example, a thickness of 2 mil or less.

In the illustrative embodiment, an aperture 435 is pre-formed through the electrode 410 thickness $T_4$. The aperture 435 can be formed using conventional methods such as, for example, punching, etching, or laser cutting. The aperture 435 is defined by an aperture surface 430 surrounding the aperture 435. The aperture 435 can be any useful size or shape. In an illustrative embodiment, the aperture 435 is rectangular, square, or round and has a cross-sectional surface area of less than 1 mm$^2$.

In the illustrative embodiment of FIG. 4A, the substrate 415 is coated with a conductive material 416 on at least a portion of, or the entire aperture surface 430. In addition, the conductive material can be disposed on at least a portion of the top surface 412 and/or at least a portion of the bottom surface 414. In some embodiments, the conductive material may be patterned on the top surface 412 and/or the bottom surface 414. The conductive material 116 on the aperture surface 430 may provide a seal that helps prevent the fuel from escaping from the aperture 435, particularly if the substrate 415 is somewhat porous to the fuel source. In an illustrative embodiment, the conductive material 116 can have any useful thickness, such as, for example, a thickness of up to 1000 Angstroms. The conductive material 116 can be a conductive metal or conductive polymer, for example.

Figure 4B:
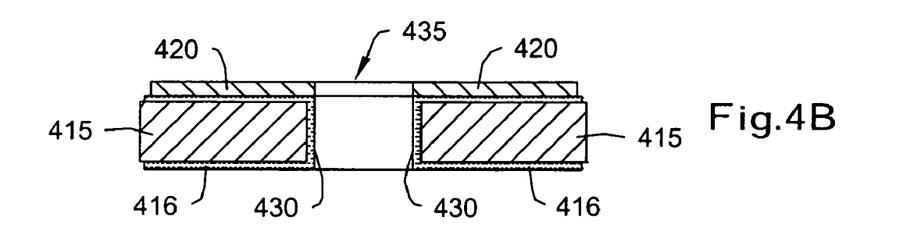

In FIG. 4B an optional adhesive layer 420 can be disposed on the electrode 410. The adhesive layer 420 may be conductive and can be disposed using conventional methods. The adhesive layer 420 can have any useful thickness. In some cases, the aperture is formed after the adhesive is applied, while in others it is formed before the adhesive is applied.

Figure 4C:
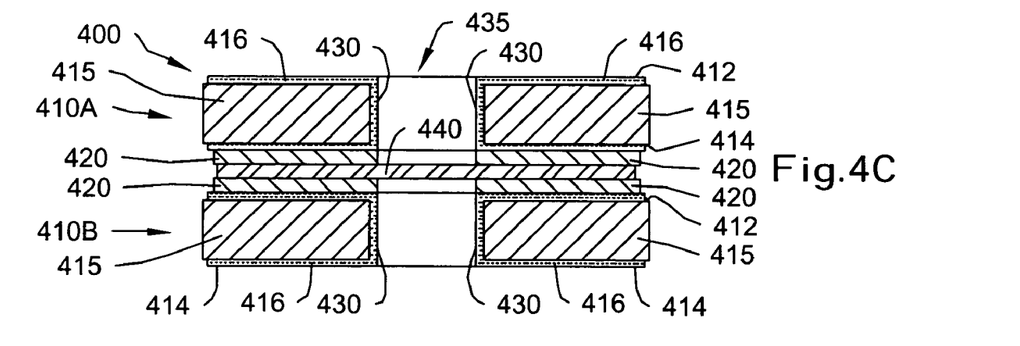
Figure 4D:
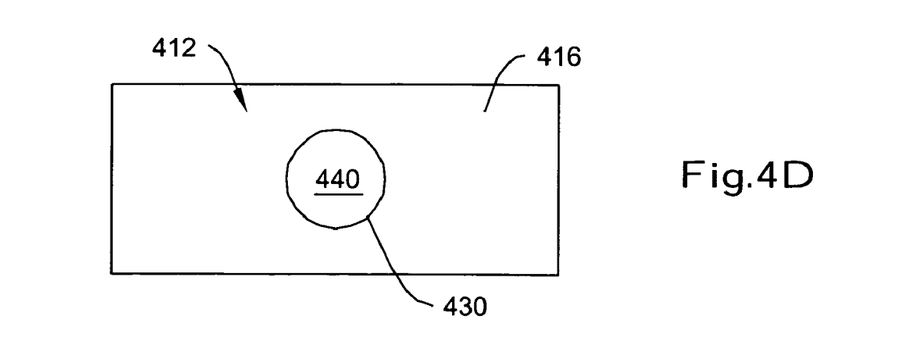
FIG. 4D is a top schematic view of the micro fuel cell shown in FIG. 4C.

FIG. 4C shows a proton exchange membrane 440 laminated between a first electrode 410A and a second electrode 410B. The first electrode 410A and the second electrode 410B can be similar to the electrode 410 described above. In the illustrative embodiment, the adhesive layer 420 is disposed between the proton exchange membrane 440 and the first electrode 410A, and between the proton exchange membrane 440 and the second electrode 410B. Like above, the aperture of the first electrode 410A is at least partially aligned with the aperture of the second electrode 410B. The completed assembly forms a fuel cell 400. The proton exchange membrane 440 can further include a top and bottom catalyst layer adjacent the proton exchange membrane 440, as described above. FIG. 4D is a top schematic view of the illustrative embodiment of a micro fuel cell 400 shown in FIG. 4C.

Figure 5:
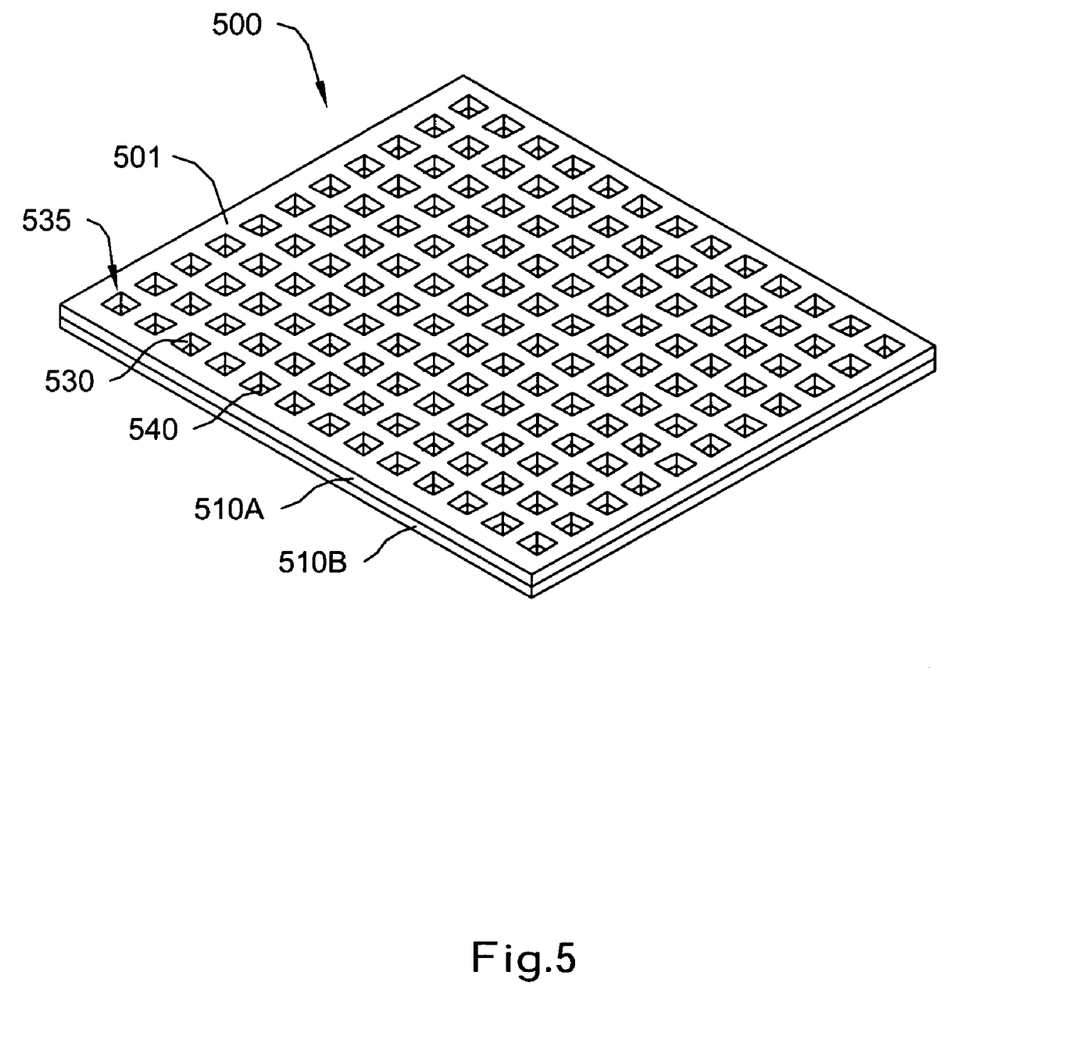
FIG. 5 is a perspective view of an array of micro fuel cells.

FIG. 5 is a perspective view of an array of micro fuel cells. In some illustrative embodiments, a plurality of micro fuel cells 500 can be economically produced on a large sheet 501 of material. The sheet 510 can include a plurality of apertures 535 through a top electrode 510A and a bottom electrode 510B, as described above. Each aperture has an aperture cross-sectional surface area 530, as described above. A proton exchange membrane 540 can be disposed between the top electrode 510A and the bottom electrode 510B, preferably spanning the apertures so as to become exposed to a fuel source.

Figure 6:
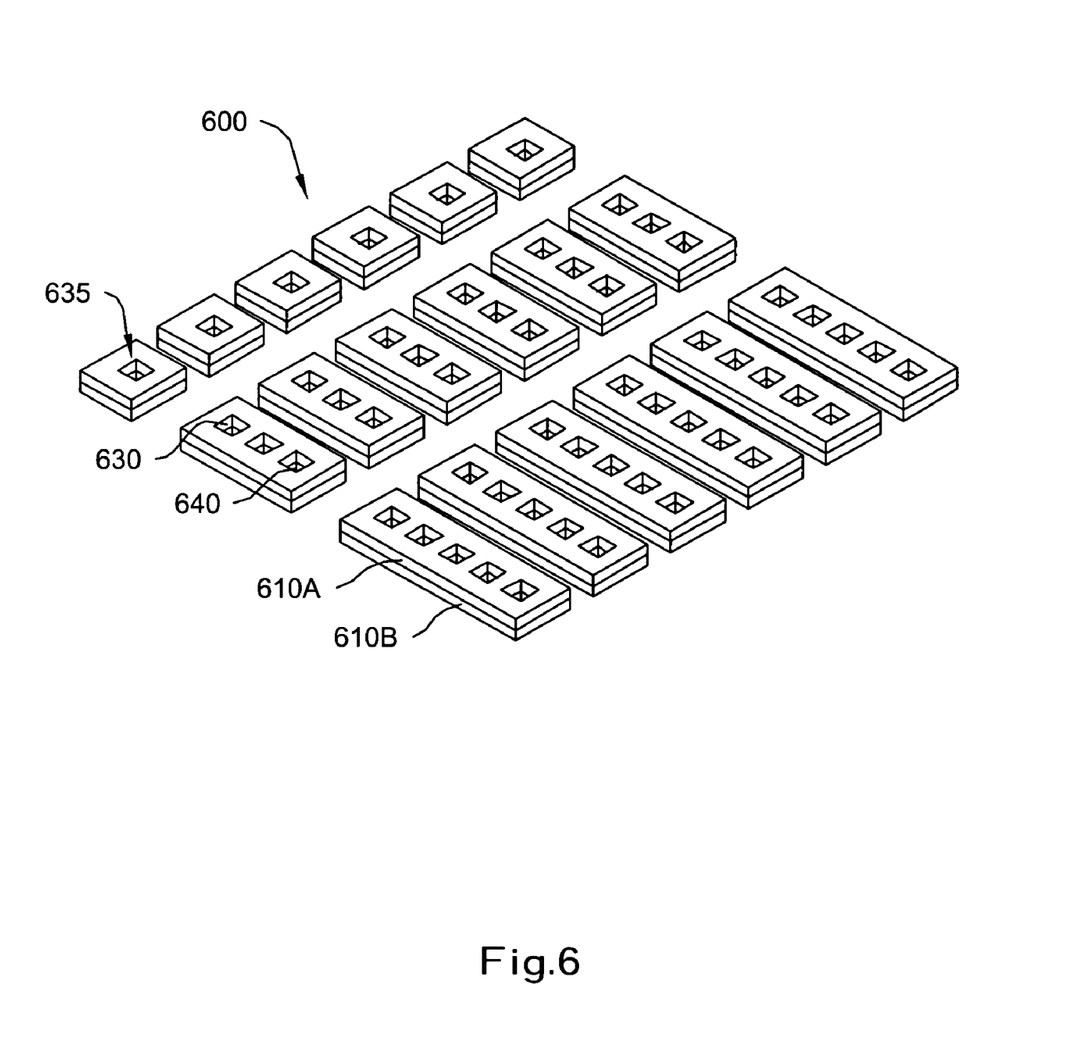
FIG. 6 is a perspective view of the array of fuel cells shown in FIG. 5 diced into various forms.

FIG. 6 is a perspective view of an array of fuel cells 600 shown in FIG. 5, diced into various forms. The sheet 501 of FIG. 5 can be divided into single fuel cells, or a plurality of fuel cell arrays. In some cases, the fuel cells in a fuel cell array can be connected in series, in parallel, or some combination thereof, depending on the application. Connecting the fuels cells in series will tend to increase the output voltage level, while connecting the fuel cells in parallel with tend to increase the output current level. Thus, by appropriately connecting the fuel cells in parallel and/or series, desired electrical output characteristics of the fuel cell can be achieved. In one illustrative embodiment, each fuel cell array can have five or more fuel cells electrically connected in series.

Figure 7:
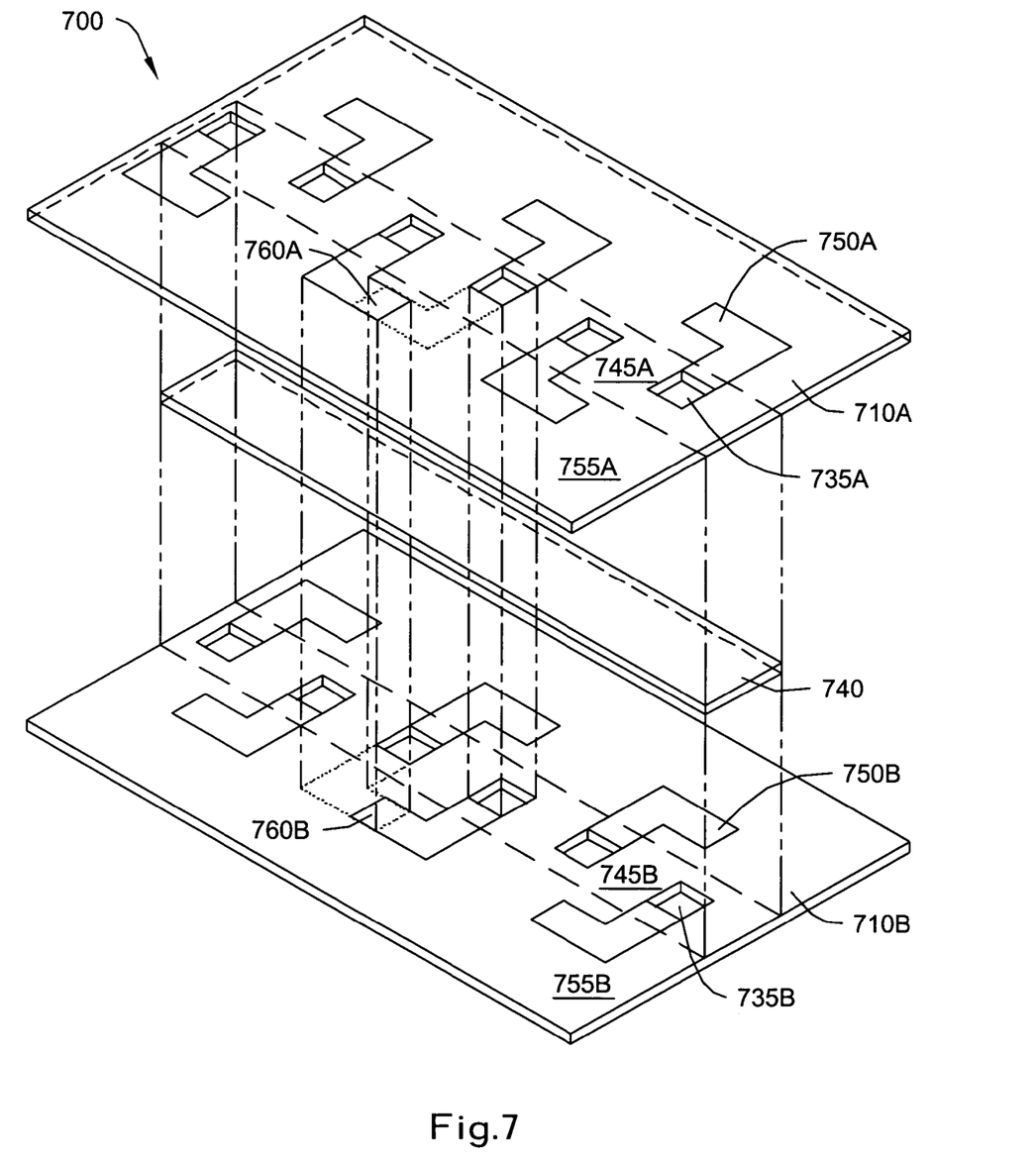
FIG. 7 is an exploded perspective view of an array of fuel cells in accordance with another illustrative embodiment of the invention.

FIG. 7 is an exploded perspective view of an array of fuel cells 700 in accordance with an illustrative embodiment of the invention. In the illustrative embodiment, a top electrode 710A has a plurality of apertures 735A and a bottom electrode 710B has a plurality of apertures 735B. The apertures 735A and 735B are shown at least partially aligned with a proton exchange membrane 740 disposed between the top electrode 710A and the bottom electrode 710B. The proton exchange membrane 740 is shown spanning the apertures 735A and 735B and extending along a proton exchange membrane (PEM) region 745A and 745B.

Electrical contacts 750A extend away from the apertures 735A on the top electrode 710A to a first region 755A. Electrical contacts 750B extend away from the apertures 735B on the bottom electrode 710B to a first region 755B. At least one electrical contact 750A on the top electrode 710A at least partially overlaps an electrical contact 750B on the bottom electrode 710B in an overlap region 760A and 760B. In the illustrative embodiment, the proton exchange membrane 740 does not extend out between the top electrode 710A or bottom electrode 710B in the overlap region 760A and 760B. Thus, when the top electrode 710A is laminated to the bottom electrode, with the proton exchange membrane 740 disposed therebetween, the electrical contact 750A on the top electrode 710A may become electrically connected to the electrical contact 750B on the bottom electrode 710B. This may electrically connect one micro fuel cell in series with another micro fuel cell. Similar methods may be used to electrically connect micro fuel cells in parallel, and/or in series and in parallel, as desired.

Figure 8:
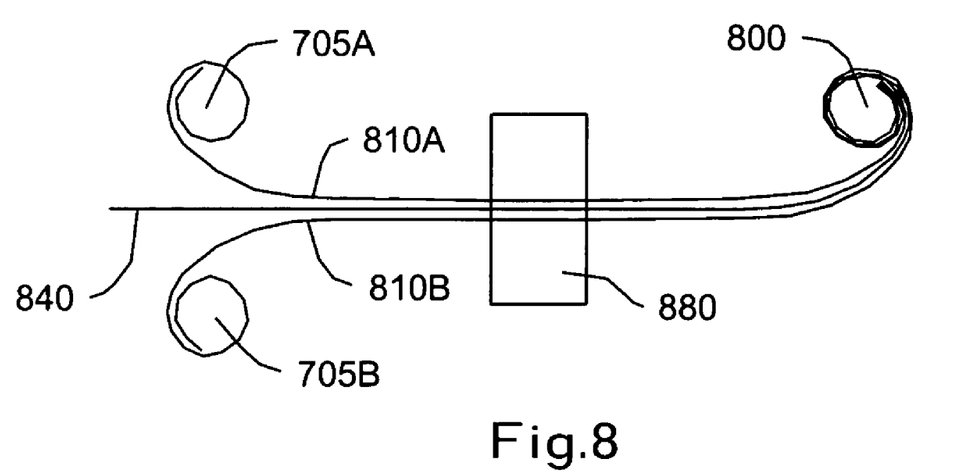
FIG. 8 is a schematic side elevation view of an illustrative method of making the micro fuel cells.

FIG. 8 is a schematic side elevation view of an illustrative method of making the micro fuel cells. In the illustrative embodiment, an array of fuel cells 800 can be formed on a continuous sheet at shown in FIG. 5 in a roll to roll process. A continuous length of top electrode 710A can be provided on a first roll 705A. For example, a continuous length of bottom electrode 710B can be provided on a second roll 705B. The continuous length of top electrode 710A and bottom electrode 710B can be simultaneous moved into a joining unit 880 with a continuous length of proton exchange membrane 840 between the continuous length of top electrode 710A and bottom electrode 710B. Apertures can be pre-formed or formed just prior to entering the joining unit 880. The apertures in the top electrode 710A and bottom electrode 710B are in at least partial registration prior to entering the joining unit 880. The joining unit 880 can be any conventional laminating operation that applies pressure to the top electrode 810A and bottom electrode 810B to form a fuel cell laminate described herein. When an adhesive is to be used, the adhesive can be applied to the proton exchange membrane and/or the top electrode 710A and bottom electrode 710B prior to entering the joining unit 880. After exiting the joining unit 880, a dicer may be provided for dicing the plurality of fuel cells into single fuel cells or fuel cell arrays, if desired.

Figure 9:
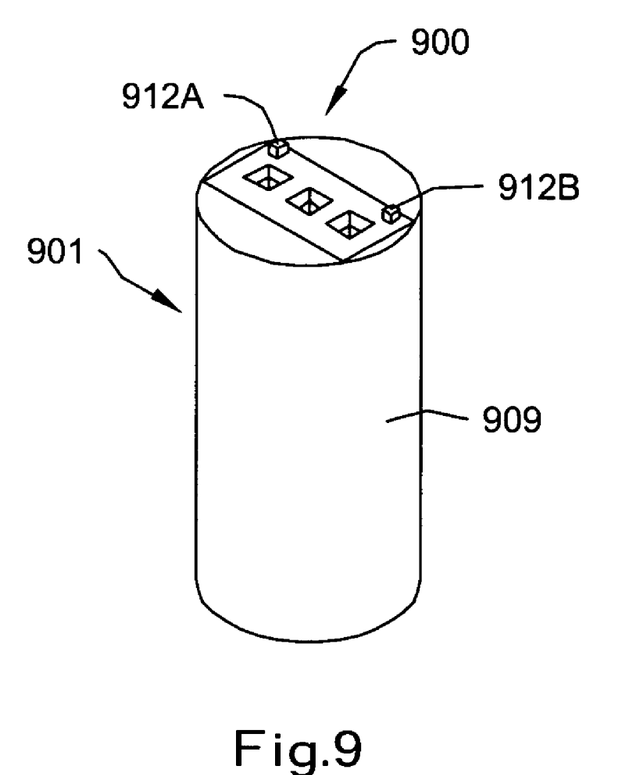
FIG. 9 is a perspective view of an illustrative fuel cell mounted to a fuel reservoir.

FIG. 9 is a perspective view of an illustrative fuel cell 900 mounted to a fuel reservoir 909. In the illustrative embodiment, a fuel cell array 900 is fixed to the reservoir 909 such that the proton exchange membrane is exposed through the apertures to the fuel in the reservoir 909. The reservoir 909 can contain a fuel source such as hydrogen or the like. The fuel cell array 900 may include electrical contacts 912A and 912B, which may represent two or more fuel cells connected in series, parallel or some combination thereof. The electrical contacts 912A and 912B may be used to provide power to an external load. In this embodiment, the byproduct is water, which collects on the outer surface of the proton exchange membrane, and evaporates into the surrounding air.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A fuel cell comprising:
a first substantially planar substrate defining a first aperture therethrough;
a second substantially planar substrate defining a second aperture therethrough;
a proton exchange membrane having a first major surface and an opposing second major surface, with an edge extending between the first major surface and the second major surface, the proton exchange membrane disposed between the first substantially planar substrate and the second substantially planar substrate so that the first major surface is supported by the first substantially planar substrate and the second major surface is supported by the second substantially planar substrate, the proton exchange membrane also spanning across the first aperture and the second aperture;
wherein, the first aperture is at least partially aligned with the second aperture and the proton exchange layer is unsupported across at least a major portion of the first aperture and the second aperture;
the first substantially planar substrate having a portion that extends laterally beyond the edge of the proton exchange membrane;
the second substantially planar substrate having a portion that extends laterally beyond the edge of the proton exchange membrane;
a first electrode extending along the first substantially planar substrate from the first aperture to the portion of the first substantially planar substrate that extends laterally beyond the edge of the proton exchange membrane; and a second electrode extending along the second substantially planar substrate from the second aperture to the portion of the second substantially planar substrate that extends laterally beyond the edge of the proton exchange membrane, wherein the first and second electrodes are positioned to be electrically connected at a location that is beyond the edge of the proton exchange membrane.

2. The fuel cell according to claim 1, wherein the proton exchange membrane has a thickness of 1 mil or less.

3. The fuel cell according to claim 2, wherein at least one of the first aperture and the second aperture has a cross-sectional area of 1 mm$^2$ or less.

4. The fuel cell according to claim 2, wherein the aligned portion of the first aperture and the second aperture has a cross-sectional area of 1 mm$^2$ or less.

5. The fuel cell according to claim 1, wherein the first substrate has a thickness of 2 mil or less.

6. The fuel cell according to claim 5, wherein the second substrate has a thickness of 2 mil or less.

7. The fuel cell according to claim 1 wherein the first electrode is positioned on an inner surface of the first substantially planar substrate facing the proton exchange membrane.

8. The fuel cell according to claim 7 wherein the second electrode is positioned on an inner surface of the second substantially planar substrate facing the proton exchange membrane.

9. The fuel cell according to claim 8 wherein the second electrode extends adjacent to the second aperture.

10. A fuel cell according to claim 9 wherein the inner surface of the first substantially planar substrate extends beyond the edge of the proton exchange membrane to a first interconnect region, and the inner surface of the second substantially planar substrate extends beyond the edge of the proton exchange membrane to a second interconnect region, wherein the first electrode extends into the first interconnect region and the second electrode extends into the second interconnect region.

* * * * *